United States Patent [19]
Campbell

[11] Patent Number: 5,625,756
[45] Date of Patent: Apr. 29, 1997

[54] EFFICIENT USE OF DITHER MATRIX BASED GRAY LEVEL PATTERNS

[75] Inventor: Russell Campbell, Boise, Id.

[73] Assignee: Hewlett-Packard Company, Palo Alto, Calif.

[21] Appl. No.: 636,492

[22] Filed: Apr. 23, 1996

[51] Int. Cl.$^6$ .............................. G06K 15/00; H04N 1/40
[52] U.S. Cl. ........................ 395/109; 358/457; 358/455; 358/465; 358/466
[58] Field of Search .................................... 395/109, 101; 358/457, 465, 466, 455, 456, 458, 459, 460, 534–536, 429, 448; 382/270, 169–172

[56] References Cited

U.S. PATENT DOCUMENTS

| 5,107,349 | 4/1992 | Ng et al. | 358/457 |
| 5,150,428 | 9/1992 | Leone et al. | 358/466 |
| 5,177,623 | 1/1993 | Hirota | 358/457 |
| 5,315,669 | 5/1994 | Kumagi | 358/457 |

Primary Examiner—Arthur G. Evans
Assistant Examiner—Tracy M. Legree

[57] ABSTRACT

A printer apparatus and method for operating a digital printer are provided which utilize a super-pixel bit map set containing a plurality of pixel pattern bit maps, each pixel pattern bit map defining the on or off condition for a plurality of individual pixels which make up a super-pixel which forms a part of a printed area, such as for gray or color shading. The method includes accepting an input value for a particular super-pixel to be printed, the input value being from one of a set of available input values defined by an input array set; providing a threshold array which defines available pixel pattern bit maps which can be used in printing super-pixels for a particular print job; producing a key array which assigns a different key identifier to each of the available pixel pattern bit maps defined by the threshold array; associating an input value with a key identifier; using the key identifier to access or build and access a suitable pixel pattern bit map for a particular super-pixel to be printed; and transferring the pixel pattern bit map to effect printing of the super-pixel being printed.

20 Claims, 8 Drawing Sheets

FIG. 1

| j | T ARRAY |
|---|---|
| 0 | 9 |
| 1 | 24 |
| 2 | 49 |
| 3 | 74 |
| 4 | 99 |
| 5 | 124 |
| 6 | 149 |
| 7 | 174 |
| 8 | 199 |
| 9 | 224 |
| 10 | 255 |

| INPUT VALUE (i) | KEY ARRAY |
|---|---|
| 0 | 0 |
| 1 | 1 |
| 2 | 1 |
| 3 | 1 |
| 4 | 1 |
| 5 | 1 |
| 6 | 1 |
| 7 | 1 |
| 8 | 1 |
| 9 | 1 |
| 10 | 2 |
| 253 | 11 |
| 254 | 11 |
| 255 | 11 |

N−2=10 UNIQUE VALUES

N=12 UNIQUE GRAYS
(COUNTING BLACK AND WHITE)

EFFICIENT USE OF DITHER MATRIX BASED GRAY LEVEL PATTERNS

FIELD OF THE INVENTION

This invention relates to digital printers which use threshold arrays to simulate color or gray levels, and more particularly, to a digital printer which avoids generating unnecessary duplicate patterns which are used by the printer to simulate color or gray component intensity.

BACKGROUND OF THE INVENTION

Inkjet printers and laser printers are capable of producing full color images with high quality and precision. Such color printers are controlled by a printer driver program which provides an interface between an application program running on a host processor and the printer.

RGB is a color space that uses as its primary colors red, green, and blue. These three colors are the primary "additive" colors. In devices that use projected light to produce an image (for example, televisions or computer monitors), the complete spectrum of colors can be reproduced using red, green, and blue. Red and green combine to form yellow, red and blue to form magenta, green and blue to form cyan, and all three to form white. Any other shade can be produced by combining different amounts of the three primary colors.

Digital half-toning refers to any process that creates the illusion of continuous tone images or shades by judicious arrangement of binary picture elements, such as dots in the case of laser printers, and ink drops in the case of inkjet printers. Thus, half-toning is printing the simulation of a continuous-tone image, such as a shaded drawing or a photograph, with groups or cells of color or black dots. The dots are placed in such a way that they appear to the human eye to be a single color. Digital half-toning is sometimes referred to as dithering.

Dithering or half-toning can be used to reproduce gray shades using only black ink. Dithers are implemented by use of a dither cell, also known as a dither matrix or threshold array. In a monochrome printer, various gray levels are generated using a so-called super-pixel paint brush typically having a defined dimension such as 16×16. A super-pixel paint brush (also referred to as a super-pixel) is generated from two inputs. The first input is a relative gray request in the form of an index typically called an Index Direct Gray having a range of index or input values. The second input is a threshold array having a plurality of elements for holding values. Typically, each entry corresponds to a pixel in the super-pixel. Individual pixels in the super-pixel are white only when the index or input value exceeds the corresponding value in the threshold array. Otherwise, individual pixels are black. Other polarity choices or selections are possible.

As an example, consider a threshold array which is 16×16 in dimension having a total of 256 elements. Each element would be capable of holding a value in the range of between 1 to 254. An index for use with such a threshold array would have a range of values from 0 to 255. To effect printing of a particular super-pixel, a selected index value would be compared with each threshold array element value for the purpose of turning a corresponding pixel in a pixel pattern bit map either "on" or "off". A corresponding pixel pattern bit map would then be processed for forming video strips which are used for painting or imaging source objects with a selected gray level or color. For example, for an index value of 1, all pixels in the 16×16 super-pixel would be marked black that do not match a 1 value in the threshold array. Likewise, when the index value is 2, all pixels corresponding to values 1 or 2 would be marked black. This comparison continues up through the value of 255 when no pixels in the 16×16 super-pixel would be marked black (i.e., they would all be white). The algorithm used here is that if the input index is greater than the dither matrix cell entry, black is selected, else white is selected. Other similar algorithms or polarities can accomplish the same end. This implementation is for illustration of one efficient method.

Throughout the range of index or input values, a duplicate super-pixel is generated whenever an index value is missing from the threshold array. For example, suppose that the index value 3 did not appear in the threshold array, but that values 2 and 4 did. Then, the super-pixel generated for index value 2 would be the same as that generated for index value 3 because using the threshold of either 2 or 3 would compare the same. Threshold array sizes may vary, but it is normal to keep the range of elements of the threshold array from 1 to 254, as long as such a range is more than the human eye can discriminate. Accordingly, this corresponds to 254 possible grays, plus black and white. For purposes of ongoing discussion, black and white are considered as possible grays so that the total is 256.

It has become a recognized practice to eliminate index values from a threshold array because the human eye simply cannot distinguish the full set of 256 gray levels. Each missing index value, however, results in one additional duplicate pattern being generated by the printer.

Previously, the approach taken was to generate the complete set of grays, i.e. 256 gray levels, which wasted precious printer memory because a multiplicity of duplicate patterns were generated. A simple attempt to eliminate the duplicates by proportionally scaling the index values to the maximum number of gray levels introduces errors because of the non-linear distribution of grays. That is, when a threshold array is developed, the resulting unique set of grays is usually not constrained to map linearly from the gray index. Usually, the duplicates are distributed non-linearly with higher density in the lighter grays where the human eye can discriminate differences with more acuity.

Thus, there is a need to improve the manner in which threshold arrays are processed for producing super-pixels which correctly reduce or eliminate the number of duplicate patterns generated.

SUMMARY OF THE INVENTION

A printer apparatus and method for operating a digital printer are provided which utilize a super-pixel bit map set containing a plurality of pixel pattern bit maps, each pixel pattern bit map defining the on or off condition for a plurality of individual pixels which make up a super-pixel which forms a part of a printed area, such as for gray or color shading. The method includes accepting an Index Direct Gray input value for a particular super-pixel to be printed, the input value being from one of a set of available input values defined by an input array; providing a threshold array which defines available pixel pattern bit maps which can be used in printing super-pixels for a particular print job; producing a key array which assigns a different key identifier to each of the unique pixel pattern bit maps defined by the threshold array; associating an input value with a unique key identifier; using the key identifier to access the correct pixel pattern bit map for a particular super-pixel to be printed; and transferring the pixel pattern bit map to effect printing of the super-pixel being printed.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

PRINTER SYSTEM

Figure 1:
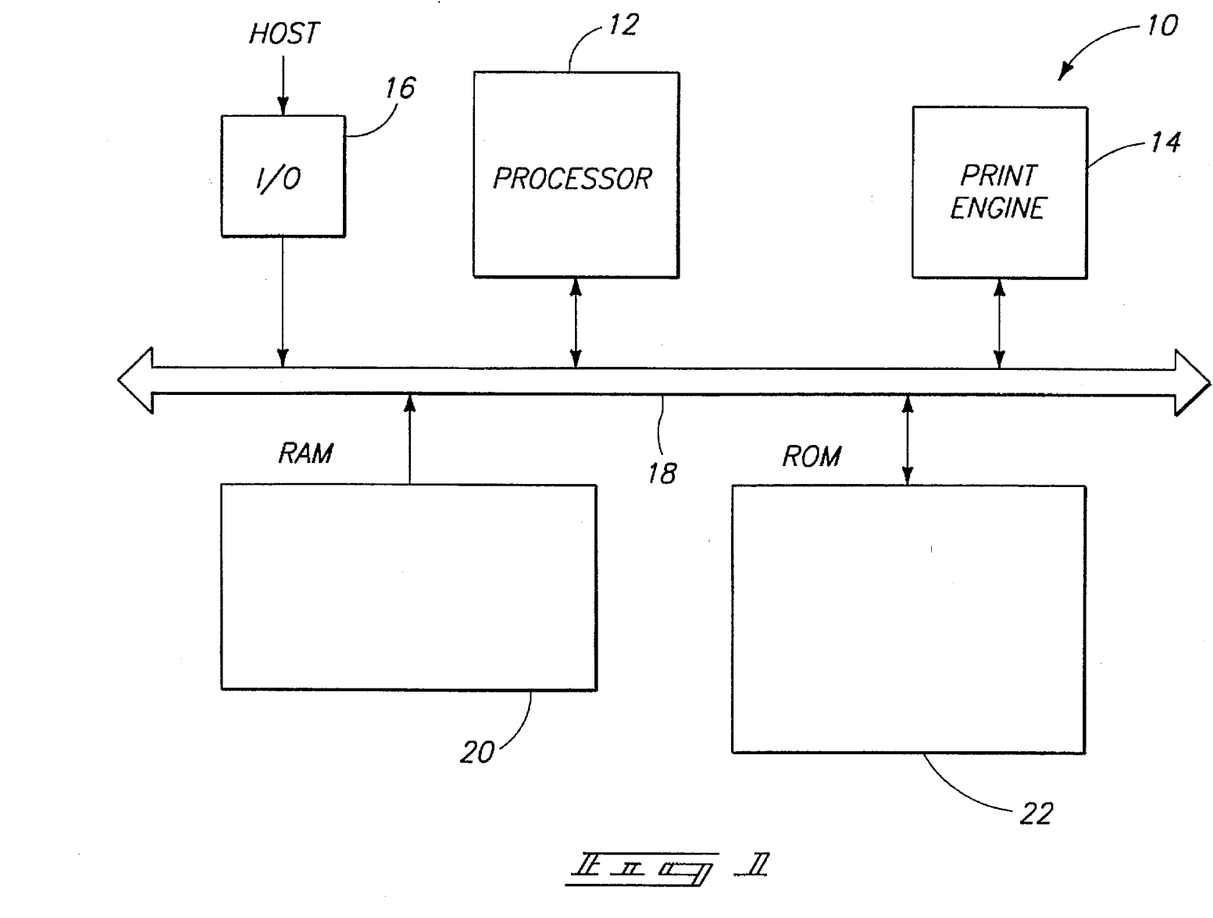
FIG. 1 is a high level block diagram of a printer that is adapted to carry out the invention.

In FIG. 1, digital printer 10 includes a processor 12, print engine 14, and an input/output (I/O) port 16, all connected by a bus 18. Print engine 14 comprises a laser printer which, when operated, runs at a constant speed and must be provided with video raster printer data at a rate that keeps up with its operation. Other printers using digitally specified pixels and super-pixels are also represented by print engine 14. A random access memory (RAM) 20 and a read-only memory (ROM) 22 are also connected to bus 18, and contain procedures and other necessary data to operate the printer, and particularly print engine 14. The operation of printer 10 is set forth in more detail in my U.S. Pat. No. 5,479,587, the disclosure of which is expressly incorporated herein by reference.

Figure 2:
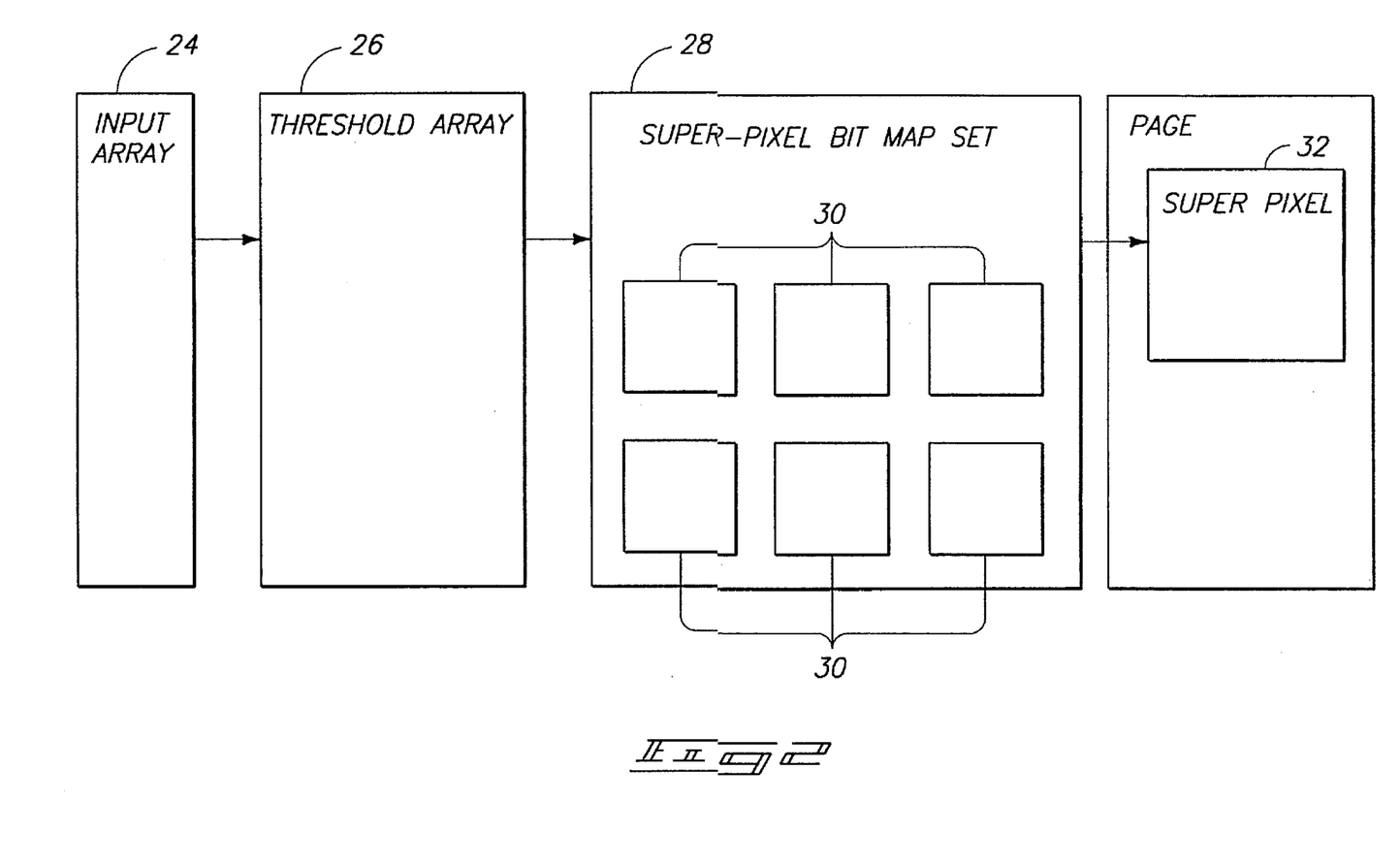
FIG. 2 is a block diagram illustrating various components either used or produced by the current invention.

In FIG. 2, a high level block diagram illustrates an input array 24, a threshold array 26, and a super-pixel bit map set 28 containing a plurality of pixel pattern bit maps referred to collectively at 30. Each pixel pattern bit map 30 defines the "on" or "off" condition for a plurality of individual pixels which make up collectively a super-pixel 32 which forms a part of a printed area. Super-pixel 32 and others like it are useful for providing gray or color shading. For purposes of the ongoing discussion, and by way of example only, input array 24 will be considered to define a set of available input values in the range of 0–255, wherein an input value of 0 corresponds to a super-pixel which is all black, and wherein an input value of 255 corresponds to a super-pixel which is all white. Intermediate input values correspond to monotonically decreasing gray shade values. Array 24 is an abstraction to represent the possible values of the Index Direct Gray (0–255). Array 24 is usually not implemented per se. Further, threshold array 26 will be discussed in the context of a 16×16 threshold array having 256 separate elements, each of which is capable of holding a value which is used to fill one pixel pattern bit maps for super-pixel bit map set 28. It is to be understood, however, that input array 24 may have any number of input values and that threshold array 26 may be any suitable size. In fact, often times it is desirable to expand threshold array 26 from a 16×16 dimension to a 32×32 dimension for purposes of improving image resolution. Furthermore, it is to be understood that although the embodiments described below are described in the context of providing monotonically-variable shades of gray, variable color shades could be provided in accordance with the teachings of this disclosure, and that the provision of both gray and color shades are within the spirit and scope of this invention.

Global Flow Diagram

Figure 3:
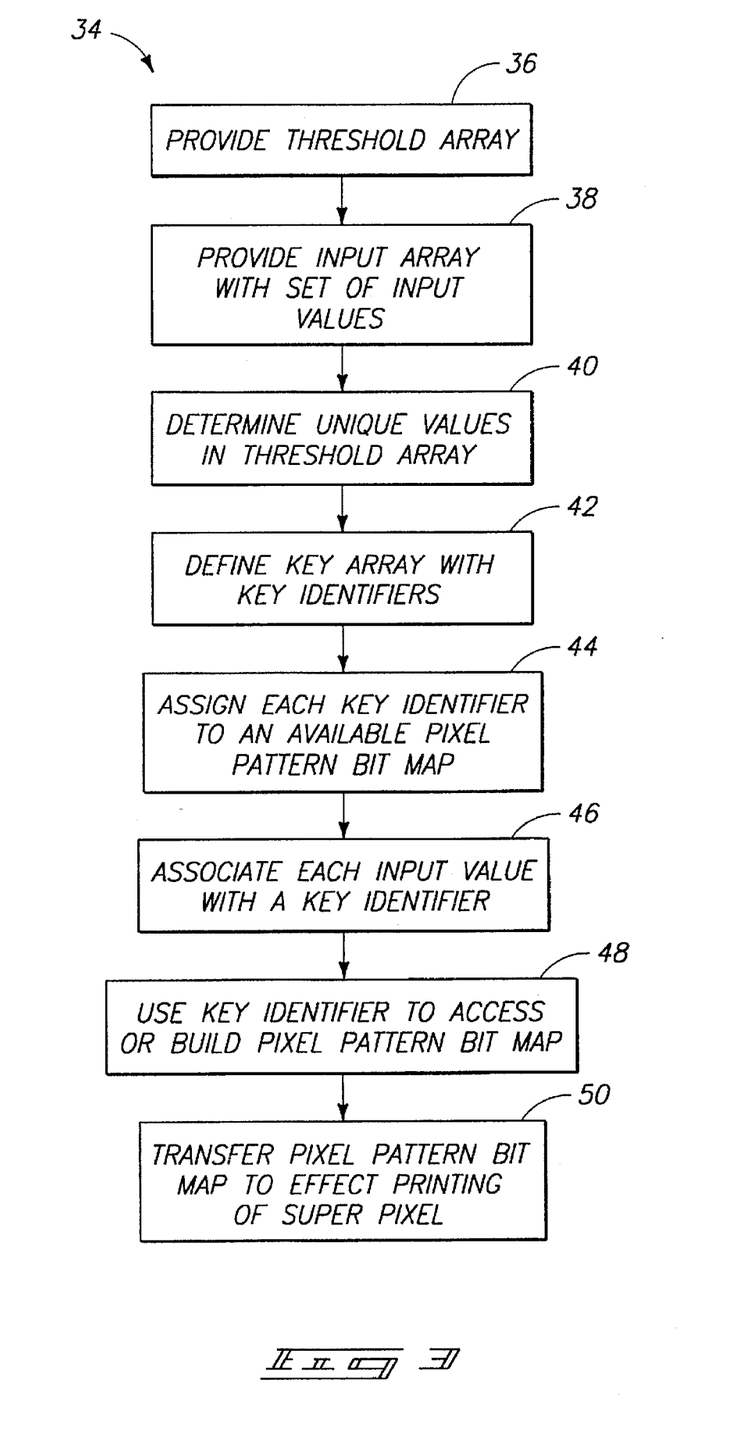
FIG. 3 is a high level schematic showing the procedure followed by a printer incorporating the invention.
Figure 6:
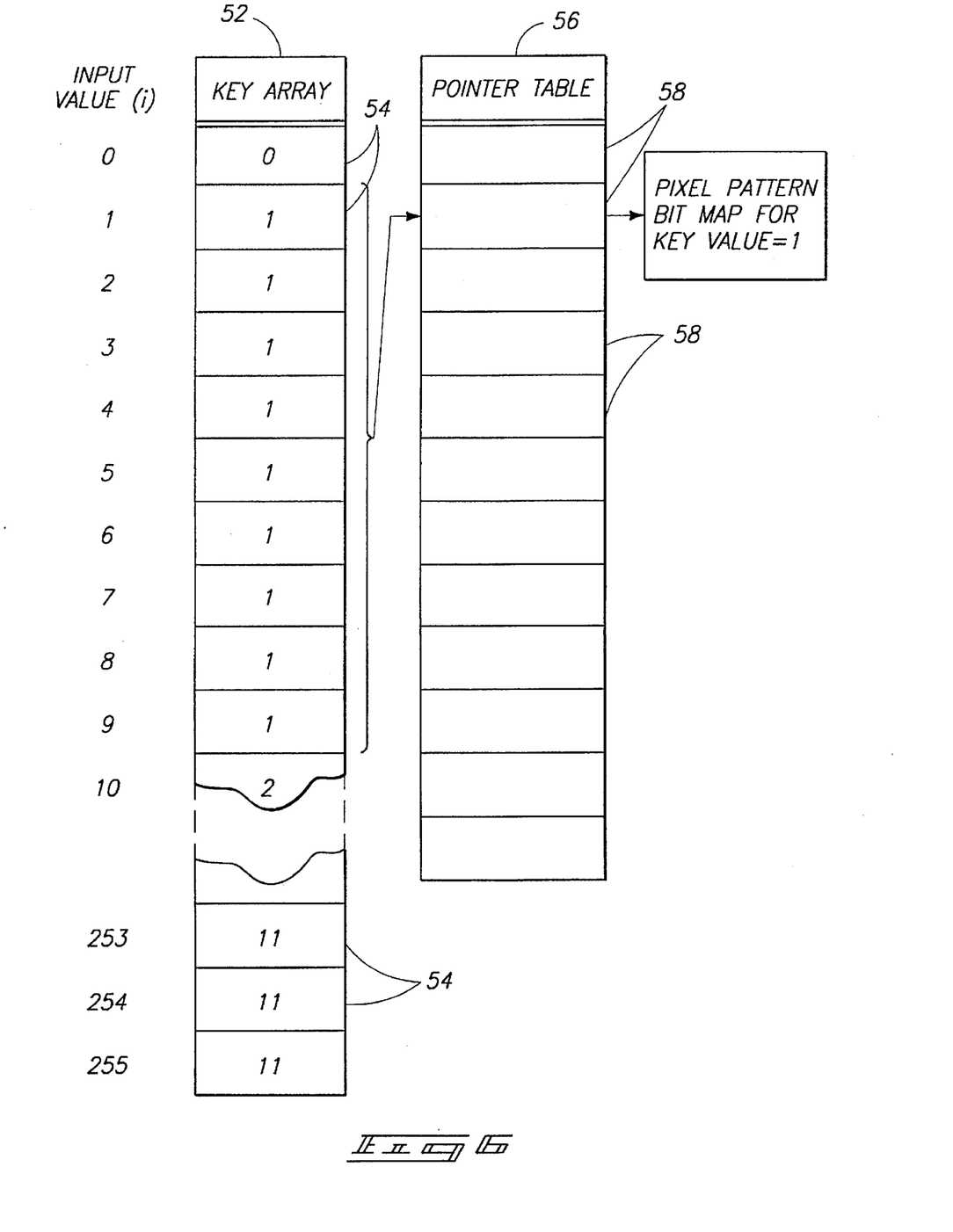
FIG. 6 illustrates a key array and a pointer table in accordance with one aspect of the invention.

The procedure for producing super-pixels which eliminates the number of duplicate pixel pattern bit maps will be better understood by referring to FIGS. 3 and 6.

For purposes of the ongoing discussion, the term "pixel pattern bit map" will be understood to mean an actual pixel pattern bit map which is capable of being stored in a memory location in printer 10 (such as RAM 20 or ROM 22) or a programmed routine which may be called selectively for generating a pixel pattern bit map as will be described below.

FIG. 3 shows a diagram 34 which sets forth one preferred embodiment of the invented method. Initially, a threshold array (box 36) and an input array (box 38) are provided. It will be understood that the threshold array may be an inherent component of printer 10 by being provided in a memory location (such as ROM 22), or that the threshold array may be downloaded via I/O port 16 (FIG. 1) from a host and placed into RAM 20. It may also be generated by the printer from inputs such as screen angle, line frequency, spot intensity, or some other enumeration. With color, the latter is preferred because it allows more flexibility in accounting for printer manufacture variations. Furthermore, it will be appreciated that multiple threshold arrays may be downloaded and stored in RAM 20 for selective use by printer 10.

Each threshold array, whether downloaded from a host or present in ROM 22, defines the available pixel pattern bit maps which can be used in printing super-pixels for a particular page or printer job. Each threshold array includes a plurality of elements and each element is capable of holding a value. Thus, a 16×16 threshold array would include 256 elements, and each element would be capable of holding a value ranging from 1–254. The number of available pixel pattern bit maps is proportional to the number of so-called unique values present in the threshold array. Unique values are determined (box 40) by counting the number of input values from the input array which match a threshold array value. There are a variety of simple methods to count the number of unique values. Each unique value in the threshold array results in a pixel pattern bit map, and in turn, each pixel pattern bit map defines a super-pixel which is different from any other super-pixel for a particular threshold array. Input values which are non-unique are those values which are not found in a particular threshold array. Non-unique input values are those values which would produce a duplicate pixel pattern bit map. This is due to the fact that non-unique input values would compare the same as certain unique input values when a particular pixel pattern bit map was being built as described above. Duplicate pixel pattern bit maps are undesirable because of the excess work a printer must do and the potential impact on printer memory usage.

After the number of unique values are determined, a key array (box 42) is produced by allocating printer memory which, preferably, includes 256 bytes of continuous memory. Each byte defines a key identifier which is assigned (or will be assigned) to each of the available pixel pattern bit maps (box 44). The number of different key identifiers is equal to the number of available pixel pattern bit maps. Each input value is then associated with a key identifier (box 46) and a key identifier is used to access a suitable pixel pattern bit map for a particular super-pixel to be printed (box 48). If the pixel pattern has not yet been built, building is done so that access is possible. The pixel pattern bit map is then transferred for processing by the printer to effect printing of the super-pixel (box 50).

Association of Input Values and Key Indentifiers

Preferably, when an association is drawn between an input value and a key identifier (box 46), input values which do not match any threshold array values are assigned a key identifier of a next adjacent input value which matches a threshold array value. In the event more than one adjacent input value does not match a threshold array value, each non-matching input value is assigned an equal key identifier, and the string of non-matching input values are assigned a key identifier of a next adjacent input value which matches a threshold array value. This ensures that a duplicate pixel pattern bit map is not generated in the event a non-matching input value is accepted for a particular super-pixel to be printed.

Figure 4:
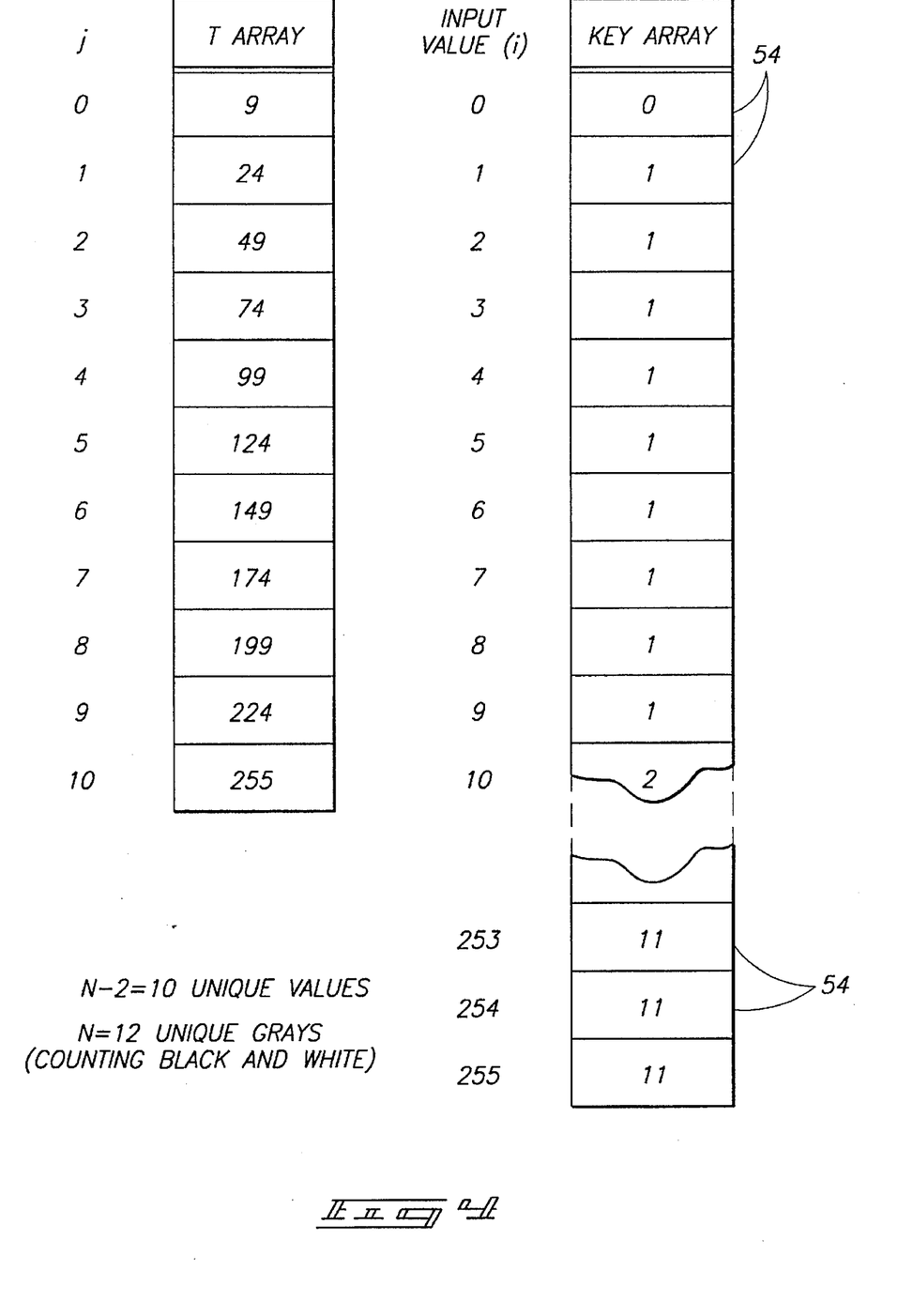
FIG. 4 illustrates a T-Array and a key array employed in accordance with one aspect of the invention.
Figure 5:
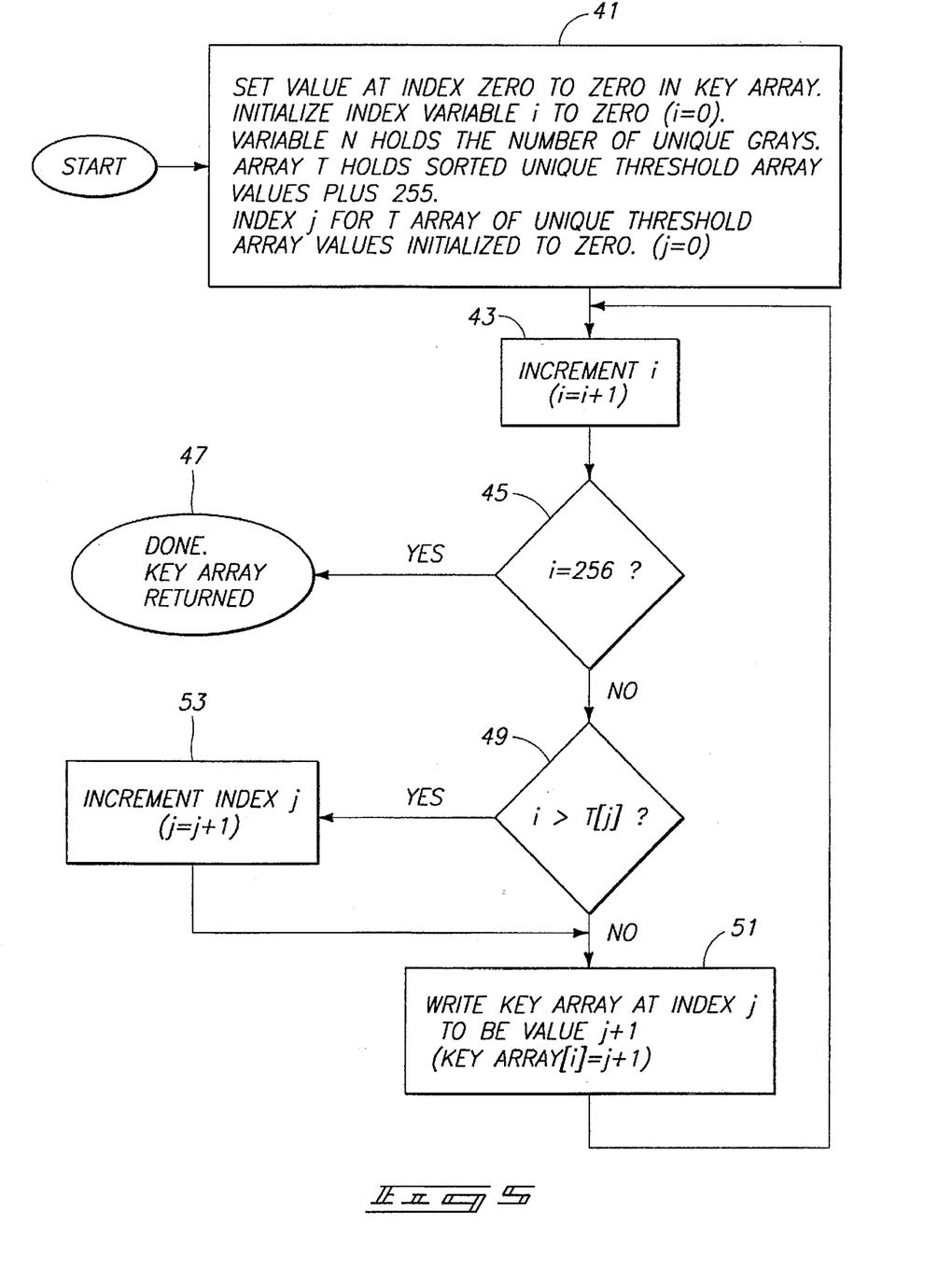
FIG. 5 is a high level flow diagram illustrating a procedure for associating input values with key identifiers.

FIGS. 4-5 show a representative method of forming this association. It is to understood that any number of methods could be employed to form this association and that the approach described just below is not intended to limit the invention in any way.

Once the unique values in a given threshold array are determined, the unique values are sorted and placed in ascending order into a temporary array or T-Array such as the one shown in FIG. 4. In this particular example, the threshold array includes ten unique values, i.e. 9, 24, 49, 74, 99, 124, 149, 174, 199, and 224. The value of 255 is added so that a super-pixel of all white pixels may be produced. At this point, it should be noted that although there are 10 unique values in the threshold array, there is a possibility of 12 unique grays. This is because super-pixels of all black (input value=0) and all white (input value=255) are counted as grays. The unique values are then assigned an index number, in this case, j designates index numbers of 0-11.

Referring to FIG. 5, after an initialization step at 41, the input values are incremented at 43, and checked at step 45 to determine whether an input value equals 256 in which case the association is done and a complete key array is provided at 47. If a particular input value is not equal to 256, then at 49 a determination is made whether the input value is greater than the unique value being compared. If the input value is not greater than the unique number, then at 51 a key identifier is assigned. Equal key identifiers are assigned for each input value which is not greater than a unique value. If at 49, however, it is determined that the input value is greater than the unique value, then at 53 the j index is incremented and a next higher key identifier is assigned to the input value. As an example, in FIG. 4, input values 1 through 9 are compared to the first T-Array entry, which is 9. Because none of the input values is greater than 9, an identical key identifier, i.e. 1, is assigned. However, when the input value of 10 is compared to the first T-Array entry, it is greater than 9, so the key identifier is incremented to 2, assigned to input value 10, and the j-index of the T-Array is incremented to start comparing the next unique number, which in this case is 24. This process continues until the Key Array is filled and ensures that input values which do not match any threshold array values are assigned a key identifier of a next adjacent input value which matches a threshold array value so that one key identifier may be used to access a suitable pixel pattern bit map for any of the associated input values. As discussed below in more detail, the distribution of key identifiers within the key array will change as the contents of a particular threshold array change. The above-described method of forming an association between input values and key identifiers takes into account the dynamic nature of multiple threshold arrays and ensures that if and when a new threshold array is utilized, the association drawn between input values and key identifiers is accurate and enables the appropriate pixel pattern bit maps to be selected, as will become apparent below. It should be understood that numerous different means exist to draw the above association and that the above-described method is not intended to limit the invention in anyway.

Access of Pixel Pattern Bit Maps

After the key array is provided as described above, each key identifier may be used to access a suitable pixel pattern bit map. The term "access" should be understood to include both accessing a pixel pattern bit map stored in a memory location, or accessing a routine which may be called for generating a pixel pattern bit map. Such a routine might be stored in RAM 20 or ROM 22.

FIG. 6 shows one embodiment of the use of a key identifier to access a suitable pixel pattern bit map. More specifically, a key array 52 (formed as described above) includes a plurality of elements 54. Each of elements 54 is capable of holding a key identifier. Preferably, there are 256 elements in key array 52. A key identifier is preferably a byte value which is used to access a pixel pattern bit map. Each input value of input array 24 is associated with a key identifier as described above. In the example shown, there are 256 input values in the input array, ranging in value from 0–255. In key array 52, there are twelve different key identifiers ranging in value from 0–11. For input values of 1 through 9 a key identifier of 1 is assigned as described above. Each of input values 1 through 9, correspond to a duplicate pixel pattern bit map which does not need to be generated. A pointer table 56 is provided and includes a plurality of entries 58. The number of entries in pointer table 56 is equal to the number of available pixel pattern bit maps. In this example, there are twelve pointer table entries which correspond to twelve available pixel pattern bit maps. Each key identifier is associated with a respective one of entries 58, and each entry references a respective pixel pattern bit map.

The formation of pointer table 56 would preferably occur after the number of pixel pattern bit maps is determined, and the key identifiers are assigned as discussed above because not all possible colors or grays may be selected for use on a page or print job consisting of a plurality of pages. Initially, each table entry would carry a null value. Then, for example, if an input value of 3 were accepted, its associated key identifier of 1 would index into pointer table 56 and recognize that the corresponding entry is a null. If the corresponding entry is a null, then a routine would be called to generate a pixel pattern bit map. A pixel pattern bit map would be generated by accessing a threshold array and comparing the input value of 3 against every threshold array element, and correspondingly turning individual pixels either "on" or "off". The table entry at a key identifier of 1 would then reference the pixel pattern bit map for subsequent input values ranging between 1–9. Thus, a pixel pattern bit map is generated only when it is needed, and may be used for other input values which share a common key identifier, i.e., 1–9.

Crossover Technique

According to one feature of the invention, a so-called crossover technique is used to further conserve printer memory and processing time. This technique recognizes that there are times when allocating a pointer table such as table 56 in FIG. 4, would necessarily use up excess memory. This would be the case if, for instance, only a limited number of pixel pattern bit maps were needed. This would correspond to a situation where only a limited number of shades were needed.

Figure 7:
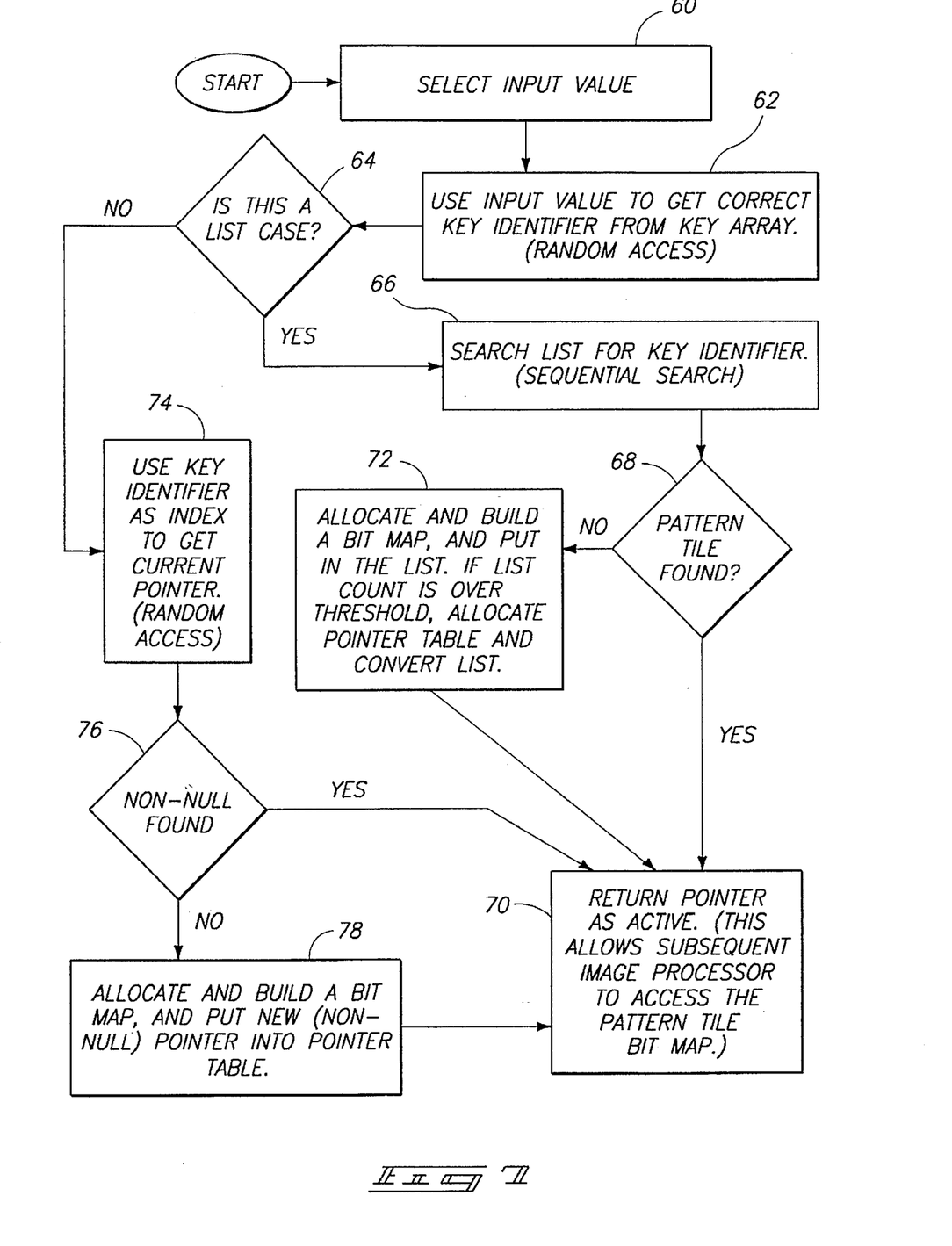
FIG. 7 is a high level flow diagram illustrating a crossover technique in accordance with one aspect of the present invention.

FIG. 7 is a flow chart of such a crossover procedure or technique. The procedure begins at a point after a particular threshold array has been processed to provide the key array, key identifiers, and to draw the associations between the input values and key identifiers as discussed above. At step 60, the host selects an input value in the range of between 0–255 for a particular super-pixel to be printed. At step 62, the input value is used to get the correct key identifier from the key array. Step 64 asks whether this is a list case. By "list case" is meant whether the number of available pixel pattern bit maps exceeds a predefined threshold number.

If the available pixel pattern bit maps does not exceed the predefined threshold number, then the case is a list case and the pixel pattern bit maps were previously linked in a list indexed for searching by a key identifier. If the bit map is found at steps 66 and 68, then a pointer is returned at step 70 which allows subsequent access to the bit map when other input values are used. If the bit map is not found, then at step 72 a routine is called for building one, and the subsequent bit map is put into the list and a pointer is returned which allows subsequent access to the bit map. If at step 72 it is determined that the list count is over the predefined threshold number, then a pointer table is allocated and the list is converted to a pointer table.

If at step 64 the available pixel pattern bit maps exceed the predefined threshold number, then the case is not a list case and at step 74 the key identifier is used as an index into a pointer table. And, as discussed above, at step 76, a determination is made as to whether a non-null table entry is found. If a non-null table entry is found, then the procedure branches to step 70 and returns a pointer which allows subsequent access to the pixel pattern bit map. If a null is found, then at step 78, a bit map is built and a new pointer is placed into the table. The crossover technique is advantageous because in the event a large number of pixel pattern bits maps are not needed, a table is not allocated which saves memory. The technique of delaying generation saves printer memory and processing time. More generally, it will be appreciated that whether the crossover technique is used or not, this advantage is available.

Multiple Threshold Arrays

As mentioned above, one aspect of the invention allows threshold arrays to be downloaded from a host for use by the printer. In some cases, it is desirable to download a number of threshold arrays and stored them in a memory location until needed by the printer. Because threshold arrays may, and often do vary in size and content, it is important to be able to adapt to the various threshold arrays. For example, one particular threshold array may have 180 unique values, while another might have 200. Being able to adjust to changing threshold arrays enables the present invention to operate a digital printer in a most efficient manner.

Figure 8:
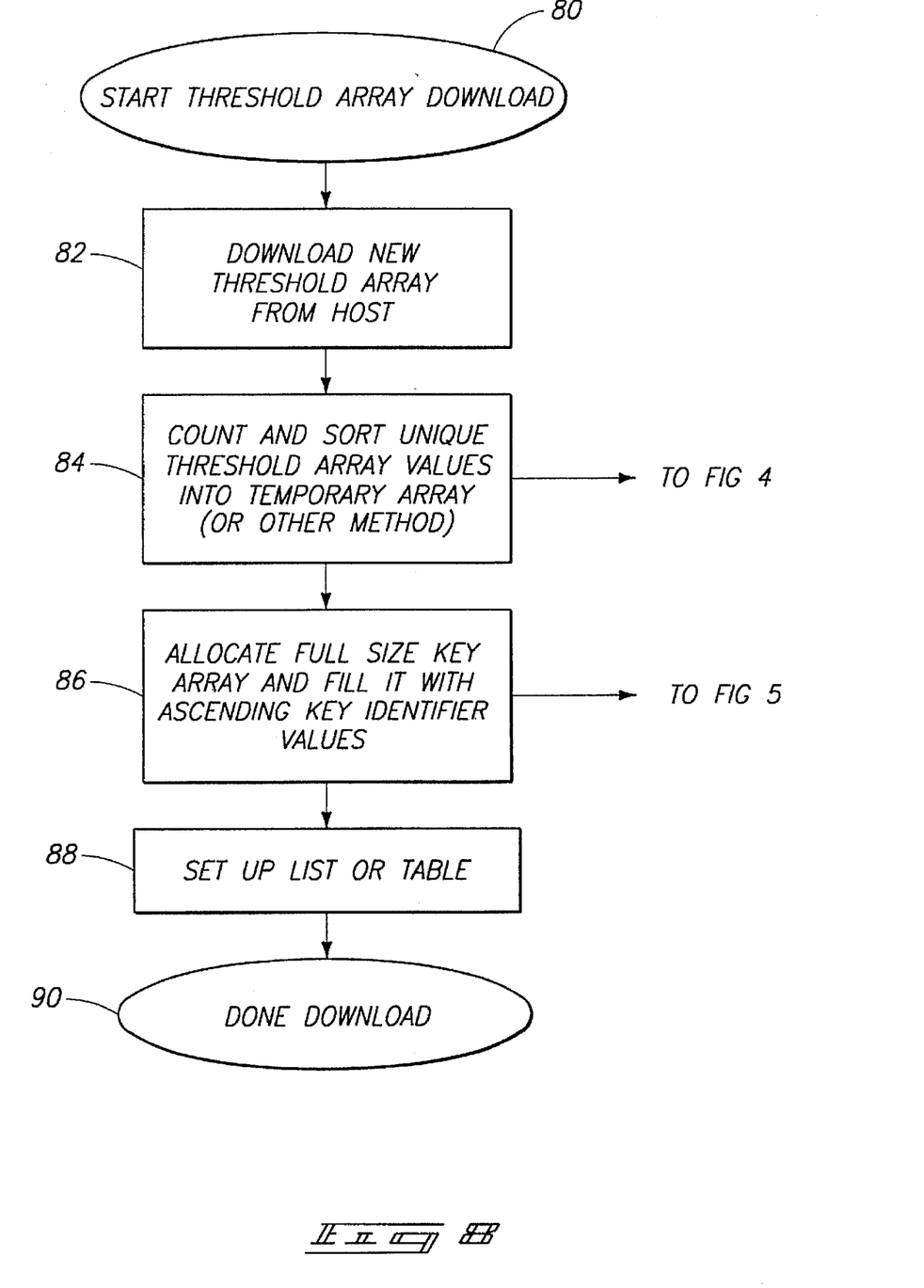
FIG. 8 is a high level flow diagram illustrating a procedure for downloading a threshold array(s) in accordance with one aspect of the present invention.

FIG. 8 is a flow chart which shows the steps undergone by a threshold array when it is downloaded from a host. It will be understood that if multiple threshold arrays are downloaded from a host, each could be stored until needed, and then called upon and processed as described below. Initially, a threshold array is downloaded at steps 80 and 82 from a host. At step 84, the number of unique threshold array values are counted and sorted in a temporary array in a manner such as that set forth in FIG. 4 and discussed above. At step 86, a key array is allocated and filled with ascending key identifiers as set forth in FIG. 5 and discussed above. At step 88, the list case is established, and no further processing is required at this time. Subsequently, when a index-gray is selected, then the approximate gray pattern tile is generated for the requested key, according to the cross-over technique shown in FIG. 7. At step 90, the download is completed, and the key identifiers may be used to access suitable pixel pattern bit maps for a particular super-pixel to be printed. It will be appreciated that as threshold array contents are changed, i.e. as the number of unique values varies from threshold array to threshold array, the corresponding key identifiers and number of table entries (if needed) will change as well so that a flexible and dynamic system is provided. Furthermore, it is to be understood that the present invention may be used to operate a digital printer utilizing a super-pixel bit map set for printing super-pixels for gray or color shading.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for operating a digital printer which utilizes a super-pixel bit map set containing a plurality of pixel pattern bit maps, each pixel pattern bit map defining the on or off condition for a plurality of individual pixels which make up a super-pixel which forms a part of a printed area, such as for gray or color shading; the method comprising:

accepting an input value for a particular super-pixel to be printed; said input value being from one of a set of available input values defined by an input array;

providing a threshold array which defines available pixel pattern bit maps which can be used in printing super-pixels for a particular print job;

producing a key array which assigns a different key identifier to each of the available pixel pattern bit maps defined by the threshold array;

associating an input value with a key identifier; and using the key identifier to access a suitable pixel pattern bit map for a particular super-pixel to be printed.

2. The method of claim 1, further comprising transferring the pixel pattern bit map to effect printing of the super-pixel being printed.

3. The method of claim 1, wherein the threshold array holds a plurality of values, and the number of available pixel pattern bit maps is proportional to the number of unique values in the threshold array, the number of unique values being equal to the number of input values which match a threshold array value.

4. The method of claim 1, wherein the threshold array holds a plurality of values, and the number of available pixel pattern bit maps is proportional to the number of unique values in the threshold array, the number of unique values being equal to the number of input values which match a threshold array value; wherein said associating step includes assigning input values which do not match any threshold array values to a key identifier of a next adjacent input value which matches a threshold array value.

5. The method of claim 1, wherein the threshold array holds a plurality of values, and the number of available pixel pattern bit maps is proportional to the number of unique values in the threshold array, the number of unique values being equal to the number of input values which match a threshold array value; wherein said associating step includes assigning input values which do not match any threshold array values to a key identifier of a next adjacent input value which matches a threshold array value; and wherein said using step includes providing a table having a plurality of entries equal in number to the number of available pixel pattern bit maps, each key identifier being associated with a respective one of the entries, and each entry referencing a respective pixel pattern bit map.

6. The method of claim 1, wherein the threshold array holds a plurality of values, and the number of available pixel pattern bit maps is proportional to the number of unique values in the threshold array, the number of unique values being equal to the number of input values which match a threshold array value; wherein said associating step includes assigning input values which do not match any threshold array values to a key identifier of a next adjacent input value which matches a threshold array value; and wherein said using step includes linking the available pixel pattern bit maps in a list indexed for searching by key identifier.

7. The method of claim 1, wherein the threshold array holds a plurality of values, and the number of available pixel pattern bit maps is proportional to the number of unique values in the threshold array, the number of unique values being equal to the number of input values which match a threshold array value; wherein said associating step includes assigning input values which do not match any threshold array values to a key identifier of a next adjacent input value which matches a threshold array value; and further comprising prior to said using step, determining whether the number of available pixel pattern bit maps exceeds a defined number, and if so, providing a table having a plurality of entries equal in number to the number of available pixel pattern bit maps, and using each key identifier to select a suitable pixel pattern bit map by associating each key identifier with a respective one of the entries, each entry referencing a respective pixel pattern bit map.

8. The method of claim 1, wherein the threshold array holds a plurality of values, and the number of available pixel pattern bit maps is proportional to the number of unique values in the threshold array, the number of unique values being equal to the number of input values which match a threshold array value; wherein said associating step includes assigning input values which do not match any threshold array values to a key identifier of a next adjacent input value which matches a threshold array value; and further comprising prior to said using step, determining whether the number of available pixel pattern bit maps exceeds a defined number, and if so, providing a table having a plurality of entries equal in number to the number of available pixel pattern bit maps, and using each key identifier to select a suitable pixel pattern bit map by associating each key identifier with a respective one of the entries, each entry referencing a respective pixel pattern bit map; otherwise, linking the available pixel pattern bit maps in a list indexed for searching by key identifier.

9. A method for operating a digital printer operatively connected to a host, which printer utilizes a super-pixel bit map set containing a plurality of pixel pattern bit maps, each pixel pattern bit map defining the on or off condition for a plurality of individual pixels which make up a super-pixel which forms a part of a printed area, such as for gray or color shading; the method comprising:

accepting an input value for a particular super-pixel to be printed; said input value being from one of a set of available input values defined by an input array;

providing at least one threshold array which is capable of being downloaded from a host to the printer, which threshold array defines available pixel pattern bit maps which can be used in printing super-pixels for a particular print job;

producing a key array which assigns a different key identifier to each of the available pixel pattern bit maps defined by the threshold array;

associating an input value with a key identifier;

using the key identifier to access a suitable pixel pattern bit map for a particular super-pixel to be printed; and transferring the pixel pattern bit map to effect printing of the super-pixel being printed.

10. The method of claim 9, wherein the printer includes a memory location capable of storing a plurality of downloaded threshold arrays which may be selected for defining available pixel pattern bit maps in a plurality of different super-pixel bit map sets.

11. The method of claim 9, wherein the printer includes a memory location capable of storing a plurality of downloaded threshold arrays which may be selected for defining available pixel pattern bit maps for a plurality of different super-pixel bit map sets; each such stored threshold array holding a plurality of values, the number of available pixel pattern bit maps for any one threshold array being proportional to the number of unique values in the threshold array, the number of unique values being equal to the number of input values which match a threshold array value.

12. The method of claim 9, wherein the printer includes a memory location capable of storing a plurality of downloaded threshold arrays which may be selected for defining available pixel pattern bit maps for a plurality of different super-pixel bit map sets; each such stored threshold array holding a plurality of values, the number of available pixel pattern bit maps for any one threshold array being proportional to the number of unique values in the threshold array, the number of unique values being equal to the number of input values which match a threshold array value; wherein said associating step includes assigning input values which do not match any selected threshold array values to a key identifier of a next adjacent input value which matches a selected threshold array values.

13. The method of claim 9, wherein the printer includes a memory location capable of storing a plurality of downloaded threshold arrays which may be selected for defining available pixel pattern bit maps for a plurality of different super-pixel bit map sets; each such stored threshold array holding a plurality of values, the number of available pixel pattern bit maps for any one threshold array being proportional to the number of unique values in the threshold array, the number of unique values being equal to the number of input values which match a threshold array value; wherein said associating step includes assigning input values which do not match any selected threshold array values to a key identifier of a next adjacent input value which matches a selected threshold array value; and wherein said using step includes providing a table having a plurality of entries equal in number to the number of available pixel pattern bit maps for a particular selected threshold array, each key identifier being associated with a respective one of the entries, and each entry referencing a respective pixel pattern bit map.

14. The method of claim 9, wherein the printer includes a memory location capable of storing a plurality of downloaded threshold arrays which may be selected for defining available pixel pattern bit maps for a plurality of different super-pixel bit map sets; each such stored threshold array holding a plurality of values, the number of available pixel pattern bit maps for any one threshold array being proportional to the number of unique values in the threshold array, the number of unique values being equal to the number of input values which match a threshold array value; wherein said associating step includes assigning input values which do not match any selected threshold array values to a key identifier of a next adjacent input value which matches a selected threshold array value; and further comprising prior to said using step, determining whether the number of available pixel pattern bit maps for a selected threshold array exceeds a defined number, and if so, providing a table having a plurality of entries equal in number to the number of available pixel pattern bit maps for a particular selected threshold array, and using each key identifier to select a suitable pixel pattern bit map by associating each key identifier with a respective one of the entries, each entry referencing a respective pixel pattern bit map; otherwise, linking the available pixel pattern bit maps in a list indexed for searching by key identifier.

15. A printer apparatus which utilizes a super-pixel bit map set containing a plurality of pixel pattern bit maps, each pixel pattern bit map defining the on or off condition for a plurality of individual pixels which make up a super-pixel which forms a part of a printed area, such as for gray or color shading; the apparatus comprising:

input array means comprising a plurality of input values; said input values corresponding to a desired shade;

threshold array means defining available pixel pattern bit maps which can be used in printing super-pixels for a particular print job;

key array means containing a plurality of key identifiers; each of said key identifiers being assigned to an available pixel pattern bit map defined by said threshold array;

means for associating an input value with a key identifier;

means for using a key identifier to access a suitable pixel pattern bit map for a particular super-pixel to be printed; and means for transferring the pixel pattern bit map to effect printing of the super-pixel being printed.

16. The apparatus of claim 15, wherein said threshold array means holds a plurality of values, and the number of available pixel pattern bit maps is proportional to the number of unique values in the threshold array, the number of unique values being equal to the number of input values which match a threshold array value.

17. The apparatus of claim 15, wherein said threshold array means holds a plurality of values, and the number of available pixel pattern bit maps is proportional to the number of unique values in the threshold array, the number of unique values being equal to the number of input values which match a threshold array value; and wherein said using means includes a pointer table having a plurality of entries equal in number to the number of available pixel pattern bit maps, and wherein each key identifier is associated with a respective one of the entries, and each entry references a respective pixel pattern bit map.

18. The apparatus of claim 15, wherein said threshold array means holds a plurality of values, and the number of available pixel pattern bit maps is proportional to the number of unique values in the threshold array, the number of unique values being equal to the number of input values which match a threshold array value; and wherein said means for associating includes means for assigning input values which do not match any threshold array values to a key identifier of a next adjacent input value which matches a threshold array value.

19. The apparatus of claim 15, further comprising memory means capable of storing at least one threshold array, and wherein said apparatus is operatively connected to a host which is capable of downloading at least one threshold array for storage in said memory means.

20. The apparatus of claim 15, wherein said threshold array means comprises a 16×16 threshold array with 256 elements; said key array means comprises a 256-byte memory and each key identifier is a byte value.

* * * * *